Patented Feb. 6, 1934

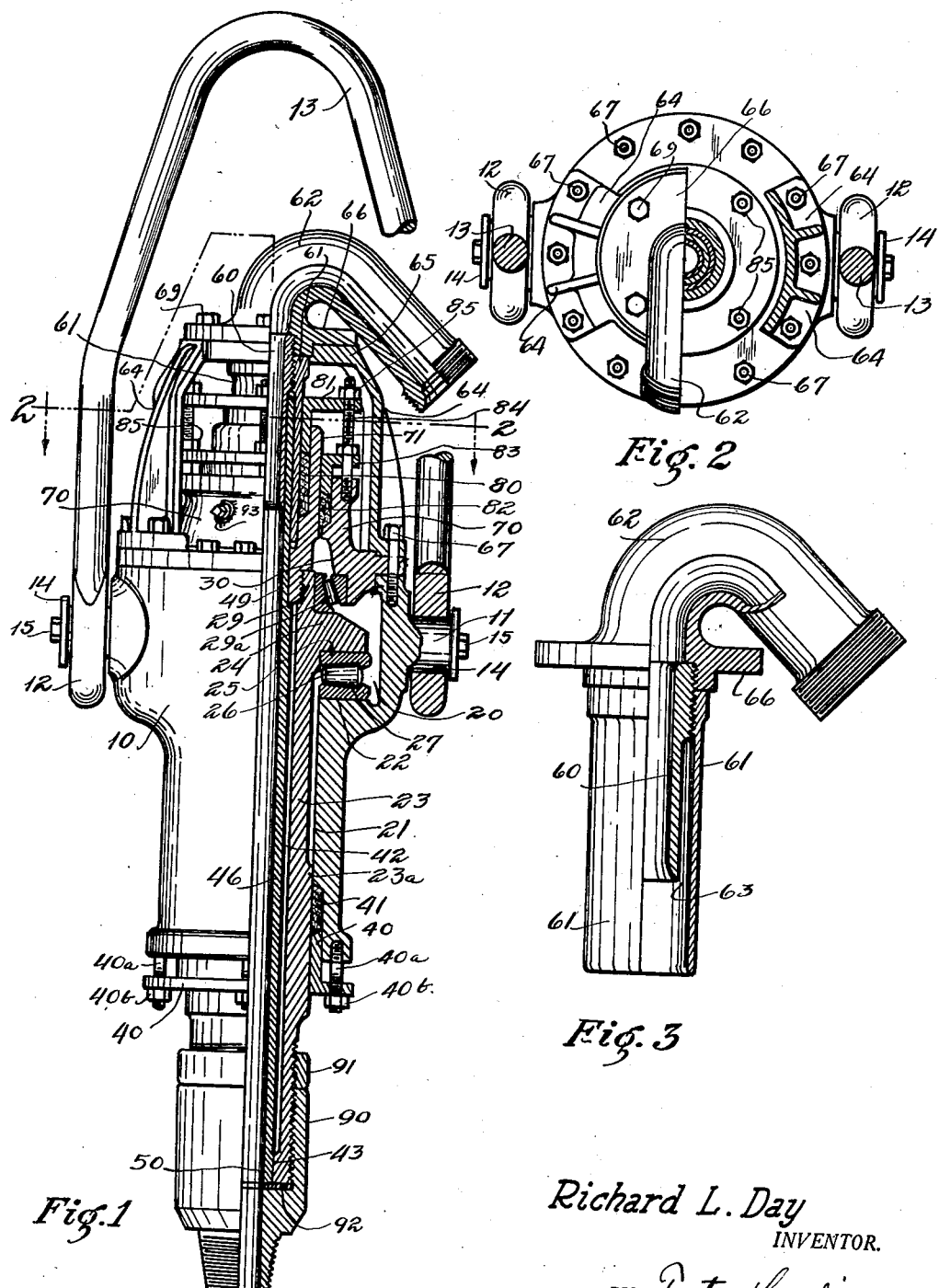

1,946,456

UNITED STATES PATENT OFFICE

1,946,456

ROTARY SWIVEL

Richard L. Day, Houston, Tex., assignor of three-fourths to E. C. Northen, Galveston, Tex.

Application April 7, 1932. Serial No. 603,852

9 Claims. (Cl. 255—25)

This invention relates to a hydraulic swivel adapted for use in connection with apparatus used in the rotary system of drilling water, oil or gas wells or other bores.

One of the objects of the invention is to increase the simplicity and accessibility of the various parts of the swivel, as well as to increase the ease with which the necessary repair and renewals of parts can be made.

Another object of the present invention is to prevent detrimental effects from binding between the conduit or conductor in the swivel which carries the drilling mud and the rotary part of the swivel which connects with the drill stem, by providing a floating drilling mud conductor or wash pipe.

Another object of the present invention is the provision of a swivel which may be opened up and repairs accomplished and parts thereof replaced even while connected to the drill stem and without removal of the latter from the bore, and while the drill stem is being rotated or is maintained stationary, as desired.

Among the other objects of the present invention is the provision of a swivel in which it is substantially impossible for drilling mud or fluid to enter upon the main moving parts of the swivel or to mix with the oil or lubricant which envelops or bathes certain moving parts as the swivel stem, head thereof, and roller bearings for these.

Still another object of the invention is the provision of an improved goose neck which may be readily connected with and disconnected from the wash pipe, which in the present embodiment is made as a separate element instead as, is sometimes the case, integral with the swivel stem hereinafter referred to, or which is merely a bore longitudinally through the swivel stem.

Other objects will appear apparent from or be specifically pointed out in the description and explanations given below.

In the accompanying drawing,

Figure 1 is a vertical view of the swivel device, partly in section and partly in perspective;

Figure 2 is a section on the line 2—2 of Figure 1 showing certain parts in section; and Figure 3 is an enlarged view of the goose neck of the swivel and bearing sleeves or tubular members carried thereby, said view being partly in section and partly in perspective.

In the embodiment of the invention illustrated in the accompanying drawing, the swivel comprises a housing or body portion 10 having trunnions 11 to which the ends 12 of the usual bail 13 are connected. The bail 13 is held against displacement from the trunnions 11 by plates 14 secured by screws 15 to the end of each trunnion.

The body portion 10 of the swivel has a cylindrical hollow portion 20 at its upper end and a smaller cylindrical hollow portion 21 which connects with the upper cylindrical portion and defines therewith an annular shoulder 22.

An elongated cylindrical stem 23, hereinafter referred to as the swivel stem, fits within the interior of the cylindrical hollow portion 21 and is adapted to be rotated in said cylindrical portion 21. Said swivel stem is circular in cross section and is enlarged near its lower end to provide a cylindrical bearing 23a. The upper end of the swivel stem 23 is provided with a circular head, collar or flange 24 which rotates with the swivel stem 23 within the cylindrical hollow portion 20 of the swivel housing or body 10. Space for lubricant is provided between the outer portions of the head and walls of the hollow cylindrical portion 20. The head 24 rests on the bearing track 25 which is supported by the roller bearings 26 in the race 27, said race 27 resting on the annular shoulder 22. The head 24 is provided with an annular internally screw threaded extension 29, much smaller in external diameter than the head 24, around which extension 29 is provided roller bearings 29a between the said extension and the cover or head plate 30 which closes the cylindrical hollow portion 20 of the device.

Between the swivel stem 23 and the lower portion of the body 10 is mounted a gland 40 adapted in connection with suitable packing 41, disposed about the bearing surface 23a, to retain lubricating oil or grease within the body portion 10. Screw threaded studs 40a and nuts 40b are provided for holding and adjusting the gland 40.

The swivel stem 23 is hollow within its interior, and this hollow is cylindrical in the embodiment illustrated and is indicated by the numeral 42. The cylindrical hollow portion 42 of the swivel stem 23 extends from top to bottom thereof, passing through the head 24 and ending at the top of the internally threaded annular extension 29. The hollow cylindrical portion 42 is contracted at its lower end to form an annular shoulder and bearing surface 43. Within this hollow cylindrical portion 42 loosely fits the removable wash pipe or drilling mud conductor 46. The lower end 50 of the wash pipe or drilling mud conductor 46 preferably fits in fluid tight relationship within the bearing surface 43 at the lower end of the swivel stem 23 and the fit is such that it may freely rotate or be rotated in the swivel stem.

The wash pipe 46 is reduced somewhat in external diameter at its upper end, the said reduced portion being indicated by means of the numeral 49, the said reduced portion having a cylindrical exterior and a cylindrical interior, each of which are ground, polished or machined as bearing surfaces for the spaced bearing sleeves or tubular members 60 and 61 carried by the goose neck 62. The upper portion 49 of the wash pipe 46 fits in the space 63 between the bearing sleeves or tubular members 60 and 61, and the surfaces of said sleeves or tubular members are ground, polished or machined as bearing surfaces for cooperation with the bearing surfaces on the interior and exterior of the upper portion 49 of the wash pipe 46. The bearing sleeves or tubular members 60 and 61 are preferably made of bronze. The sleeve or tubular member 60 is externally threaded at its upper end, as shown more clearly in Fig. 3, and is screwed into corresponding threads in the goose neck 62. The sleeve or tubular member 61 is internally threaded, as shown more clearly in Fig. 3, and threadingly engages at the upper end and on the exterior of sleeve or tubular member 60. It will thus be seen that the sleeve or tubular member 60 is first screwed into the goose neck 62 and thereafter sleeve or tubular member 61 screwed onto the exterior of sleeve or tubular member 60 until the goose neck is engaged as a stop.

The cover or head plate 30 fits fluid tight upon the top of the housing or body portion 10, and above the cover or head plate 30 is mounted the yoke 64 which has a flat top 65 with which the plate 66 on the goose neck engages, whereby the sleeve or tubular members 60 and 61 carried by the goose neck 62 are held centrally of the device for fitting respectively within and outside the upper portion 49 of the wash pipe or drilling mud conductor 46. The cover or head plate 30 and the yoke 64 are secured to the housing or body portion 10 by means of screws 67, and the goose neck 62 is secured to yoke 64 by means of screws 69.

The cover or head plate 30 is provided with an annular shaped extension 70 through which passes a short tubular member or adapter 71 which is connected at its lower end in fluid tight relationship with the head 24, for example by means of screw threads as shown in the drawing. The lower end of the short tubular member or adapter 71 is provided in its interior with a bearing surface which cooperates with the exterior of the upper portion 49 of the wash pipe 46. As will be seen in Figure 1, the short tubular member or adapter 71 surrounds the wash pipe 46 as well as the sleeve or tubular members 60 and 61, and the lower end of the sleeve or tubular member 61 fits with an annular recess in the short tubular member or adapter 71.

The numeral 80 indicates any suitable packing between the exterior of the sleeve 61 and the interior walls of the adapter 71; and 81 indicates a gland cooperating with the sleeve 61, the packing 80 and the adapter 71. The numeral 82 indicates any suitable packing between the adapter 71 and the extension 70 on the cover or head plate 30; and 83 indicates a gland cooperating with adapter 71, packing 82 and extension 70 of cover 30. The numerals 84 and 85 indicate respectively threaded studs and nuts for holding and adjusting the glands 81 and 83.

The swivel stem 23, as shown in the drawing, passes outside of the body portion 10 through the gland 40. The lower end of the swivel stem 23 which is outside of the body portion 10 is externally threaded in order to receive and be connected with a tool joint connection 90 for connecting the swivel to the grief stem of a rotary drill stem. The number 91 indicates a jam or lock nut above the tool joint 90, and the numeral 92 indicates an annular bronze or other bearing held between the tool joint 90 and the lower end of swivel stem 23, upon which annular bearing rests the wash pipe 46.

The swivel stem 23, head 24 thereof, wash pipe 46, and adapter 71 may be made of steel or any other suitable metal.

The numeral 93 indicates a screw threaded plug which closes an opening in the extension 70 of the cover 30, through which opening grease or lubricating oil is introduced into the interior of the device to bathe the moving parts. Grease or oil is introduced in sufficient quantity into the device to fill the space lying between the housing 10, the cover 30, and the extension 70 on the one hand and the swivel stem 23, its head 24 and the adapter 71 on the other hand.

The wash pipe or drilling mud conductor 46 below the reduced upper portion 49 is somewhat smaller in external diameter than the interior bore 42 of the swivel stem 23 whereby the wash pipe may be removed from the swivel stem for any purpose, as repair, inspection or replacement. The external diameter of the swivel stem 23 between the head 24 and the enlarged bearing surface 23a is somewhat smaller in diameter than the interior bore of adjacent parts of the housing or body portion 10 in order to permit a space for lubricant.

It will be seen from the foregoing description and drawing of the swivel that it is simple in construction and involves very few parts, all of which are rugged and strong, whereby repairs and renewal of parts become very infrequent. It will also appear from the foregoing description and drawing that it is a very simple matter to repair the swivel or to replace parts. By unscrewing the screws 67 holding the yoke 64 in position and loosening and removing the gland 81 if necessary, the goose neck 62 and sleeve members 60 and 61 come off with the yoke 64 when the latter is removed, because of the loose or free connection between sleeve members 60 and 61 and the wash pipe 46. When the interior of the swivel is thus exposed, the wash pipe or drilling mud conductor 46 may be removed from the device, by simply lifting it out of position, after having first removed the adapter 71. By unscrewing all of the screws 67 holding the cover 30 on the body portion 10, removing the tool joint 90, lock nut 91 and loosening gland 40, the swivel stem 23 and its associated parts and parts associated with the cover 30 may be withdrawn at one time from the housing 10. The interior of the housing 10 may also be reached without removing the swivel stem 23 by unscrewing the adapter 71 from the head 24 and thereafter removing the cover 30 and yoke 64 by unscrewing the screws holding them on the body portion 10.

The wash pipe 46 engages, at its lower end, the bearing surface 43 and, at its upper end the bearing surfaces on the sleeve members 60 and 61 in such a fit that the wash pipe 46 may be rotated on the inside of swivel stem 23 with respect to said swivel stem and also the wash pipe 46 may rotate with the swivel stem 23, the wash pipe 46 passing loosely through the lower end of the adapter for this purpose. In other words, the structure is such that the wash pipe 46 floats in or in respect to the swivel stem 23. This construction prevents detrimental effects from arising due to binding between the wash pipe 46 and the swivel stem 23, which binding may be caused by sand or mud becoming lodged or packed between the wash pipe 46 and the swivel stem 23. It will be seen that if for any reason, there is binding or considerable friction between the wash pipe 46 and the swivel stem 23, the wash pipe 46 will rotate with the swivel stem 43, and thereby rupture or mutilation of parts of the device will be prevented.

The goose neck 62 and the sleeve or tubular members 60 and 61 may be removed from the device as one unit by unscrewing the screws 69, whereupon the goose neck may be lifted vertically, the sleeve members 60 and 61 passing out through an opening in the plate 65 of the yoke 64.

From the foregoing description taken in connection with the drawing it will also be seen that the spaces of the device containing lubricant and the roller bearings is completely sealed from the parts carrying drilling mud or fluid, and that there is no possible opportunity for the drilling mud or fluid entering the parts of the device containing the lubricant and roller bearings. Should the wash pipe 46 leak at its lower end, the drilling mud or fluid may pass up between the wash pipe 46 and the swivel stem 23 but it will be prevented from entering the space containing the lubricant by the lower end of the adapter 71 which is screwed into the head 24. Should drilling mud or fluid leak out at the top of the wash pipe through the space 63, the adapter 71 will also prevent it from passing into the space containing the lubricant. The packing 80 prevents leaks or escape of drilling mud or fluid at the top of the device, and the packings 41 and 82 prevent leaks or escape of lubricant.

It is also advantageous to make the exterior diameter of the wash pipe 46 uniform in diameter throughout its length so that the said wash pipe may be inserted into position and removed from position without having first to remove the adapter 71.

The present application is a continuation in part of my copending application Serial No. 558,590, filed August 21, 1931.

I claim:

1. In a hydraulic swivel, the combination of a housing, a swivel stem mounted for rotation therein, a closure for said housing, a tubular member mounted on said swivel stem and passing through said closure and adapted to be rotated with said swivel stem, a wash pipe within said swivel stem, inlet means for delivering fluid to said wash pipe, and a non-rotating sleeve-like member associated with said inlet means extending around one end of said wash pipe and entering into said tubular member.

2. In a hydraulic swivel, the combination of a housing, a swivel stem mounted for rotation therein, a closure for said housing, a tubular member free for rotation passing through said closure and being connected with said swivel stem, a wash pipe within said swivel stem, inlet means for delivering fluid to said wash pipe, and a pair of sleeve-like members associated with said inlet means, one of which members is placed within the other and so disposed with relation to each other as to define an annular bearing space between them, said wash pipe extending into the said annular bearing space and having bearing surfaces thereon cooperating with bearing surfaces on said members.

3. In a hydraulic swivel, the combination comprising a swivel stem adapted to be rotated, a wash pipe fitted within said swivel stem, said wash pipe and swivel stem adapted to rotate independently of each other and to rotate together.

4. In a hydraulic swivel, the combination comprising a swivel stem adapted to be rotated, a wash pipe fitted within said swivel stem, the said wash pipe being loosely mounted in said swivel stem and capable of being rotated therein.

5. In a hydraulic swivel, the combination comprising a swivel stem adapted to be rotated, a wash pipe fitted within the tubular stem and adapted to float with the swivel stem in its rotation.

6. In a hydraulic swivel, the combination comprising an inlet means including a tubular member having a bearing surface exteriorly thereof and a second tubular member surrounding said first mentioned tubular member and having a bearing surface interiorly thereof, the said two bearing surfaces being spaced apart to form an annular space, a conduit for conducting fluid in said swivel having one end thereof fitting within the annular space and coacting with said bearing surfaces.

7. A hydraulic swivel comprising the combination of a housing, a swivel stem mounted for rotation therein, a top for said housing, said swivel stem passing through said top, a wash pipe within said swivel stem, and tubular means entering into the top of said swivel stem and into said wash pipe, and means for delivering fluid to said tubular means.

8. In a hydraulic swivel, the combination of a swivel stem and a wash pipe extending therein free for rotary motion therein and therewith.

9. In a hydraulic swivel, the combination of a swivel body, a swivel stem rotatable therein, a wash pipe, a supply pipe, said wash pipe extending within and longitudinally of said swivel stem and mounted within said swivel stem for free rotary movement therein or therewith.

RICHARD L. DAY.